(No Model.)

D. ROUGHEAD.
BALL BEARING FOR WHEELS.

No. 489,133. Patented Jan. 3, 1893.

Witnesses:
Emil Neuhart
Theo. L. Popp

David Roughead Inventor
By Wilhelm & Bonner
Attorneys.

UNITED STATES PATENT OFFICE.

DAVID ROUGHEAD, OF BUFFALO, NEW YORK.

BALL-BEARING FOR WHEELS.

SPECIFICATION forming part of Letters Patent No. 489,133, dated January 3, 1893.

Application filed August 29, 1892. Serial No. 444,378. (No model.)

*To all whom it may concern:*

Be it known that I, DAVID ROUGHEAD, a subject of the Queen of Great Britain, residing at Buffalo, in the county of Erie and State of New York, have invented new and useful Improvements in Ball-Bearings for Vehicle-Wheels, of which the following is a specification.

My invention relates to ball-bearings for vehicle wheels in which the balls and the bearing surfaces or cones are carried by the wheel-hub in such manner that the wheel can be removed from the axle spindle like an ordinary wheel without disturbing the balls.

The object of my invention is the production of an efficient ball bearing of this kind which is readily applied to wheel-hubs of ordinary construction.

Figure 1:
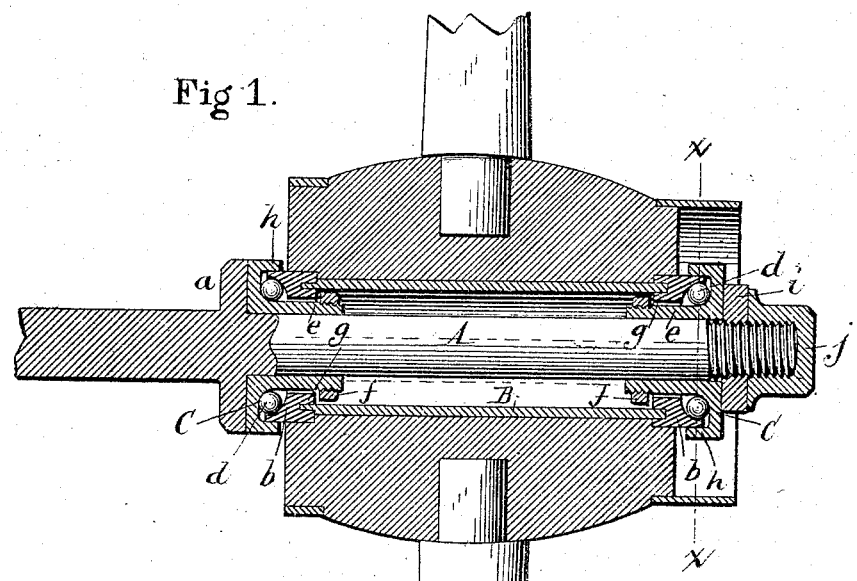
Figure 2:
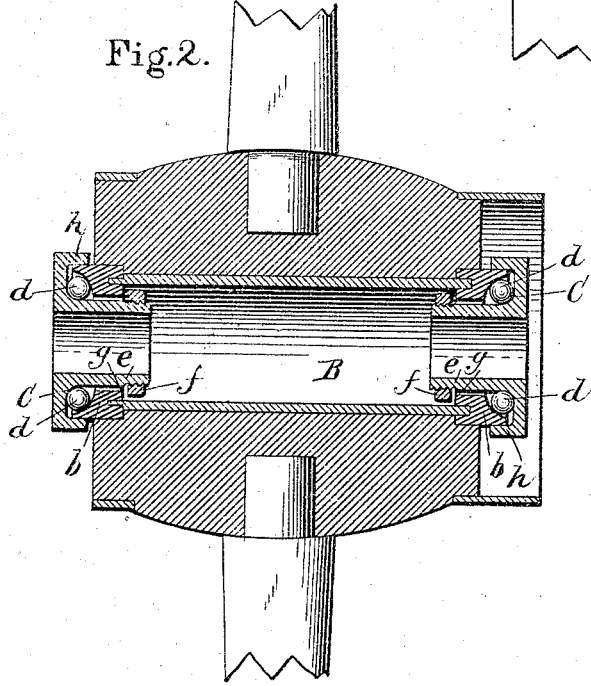
Figure 3:
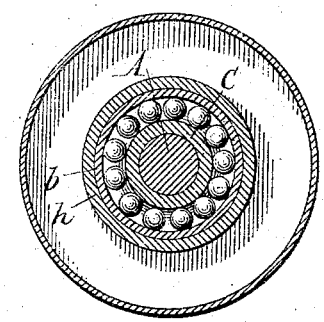

In the accompanying drawings:—Figure 1 is a sectional elevation of a wheel hub provided with my improved bearing, showing the hub applied to the axle. Fig. 2 is a similar view showing the hub removed from the axle. Fig. 3 is a cross section in line $x—x$, Fig. 1.

Like letters of reference refer to like parts in the several figures.

A is the axle spindle, and $a$ the usual collar or shoulder formed at the inner end thereof.

B represents the axle box secured within the hub and carrying at each end a cone or bearing ring $b$. These cones are preferably separate from the axle box and secured thereto in any suitable manner.

C C represent cones arranged on the outer sides of the cones $b$, and forming with the latter annular grooves in which the balls $d$ are arranged. Each of the cones C is formed with a collar $e$ which extends inward through the adjacent cone of the axle box and surrounds the axle spindle, as shown in Fig. 1. On the inner ends of the collars $e$ are arranged stops $f$, which, by coming in contact with shoulders $g$ at the inner ends of the inner cones $b$, prevent the outer cones C from being separated from the inner cones to such an extent as to allow the balls to fall out when the wheel is removed from the axle spindle. These stops preferably consist of screw nuts applied to the threaded inner ends of the collars $e$. Each of the outer cones C is formed at its outer end with a cap or inwardly projecting marginal flange $h$ which overlaps the adjacent inner cone and excludes dust &c. from the bearing surfaces.

$i$ is an adjusting nut applied to the outer threaded end of the axle spindle and bearing against the outer side of the adjacent cone C, and $j$ is a jam nut bearing against the outer side of the adjusting nut for preventing loosening thereof. Upon removing these nuts, the wheel with its ball bearings can be removed from the axle spindle and again replaced thereon, like an ordinary wheel, without disturbing any of the bearing cones or spilling the balls, the two sets of bearings remaining intact when the wheel is removed from the spindle, as shown in Fig. 2, as well as when it is on the spindle. The cones are readily adjusted for taking up wear by loosening the jam nut $j$ and screwing the adjusting nut $i$ farther inwardly on the spindle, whereby both sets of cones are simultaneously adjusted.

My improved bearing does not require a bearing box of peculiar construction, but can be used with a box of ordinary construction, it being only necessary to secure the inner cones of the bearing to the end of the axle box and recess the wooden hub to receive the inner end of such cones, thus rendering the bearing especially applicable to old wheels or wheels already in use.

I claim as my invention:—

1. In a ball bearing for vehicle wheels &c., the combination with the axle box or bushing arranged within the wheel hub, of bearing rings secured to opposite ends of the axle box and forming the inner cones of the bearing, outer cones arranged on the outer sides of the inner cones and each provided with a collar extending inwardly through the bore of the adjacent inner bearing ring or cone, stops arranged on said collars, whereby the outward movement of the outer cones with reference to the inner cones is limited, and balls interposed between the inner and outer cones, substantially as set forth.

2. In a ball bearing for vehicle wheels &c., the combination with the axle box or bushing arranged within the wheel hub, of bearings secured to opposite ends of said box, forming the inner cones of the bearing and provided with shoulders arranged within the tubular axle box, outer cones arranged on the outer sides of the inner cones and each having a collar extending inwardly through the adjacent inner bearing ring or cone and provided at its inner end with a screw thread, a stop nut applied to each of said threaded collars on the inner sides of the shoulders of the inner cones, and balls arranged between the inner and outer cones of the bearing, substantially as set forth.

3. In a ball bearing for vehicle wheels, the combination with the axle box, of bearing rings or cones secured to opposite ends of the box and forming the inner cones of the bearing, outer cones arranged adjacent to the inner cones and provided at their outer ends with caps which overlap the inner cones, collars formed on the outer cones and extending through the inner cones, stops applied to the inner ends of said collars for limiting the outward movement of the outer cones, and balls interposed between said inner and outer cones, substantially as set forth.

Witness my hand this 27th day of August 1892.

DAVID ROUGHEAD.

Witnesses:
EDWARD A. JONES,
CARL F. GEYER.